(12) United States Patent
Zurko

(10) Patent No.: US 9,424,407 B2
(45) Date of Patent: Aug. 23, 2016

(54) WEAK PASSWORD SUPPORT IN A MULTI-USER ENVIRONMENT

(75) Inventor: Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 12/346,688

(22) Filed: Dec. 30, 2008

(65) Prior Publication Data

US 2010/0169957 A1   Jul. 1, 2010

(51) Int. Cl.
*H04L 9/32* (2006.01)
*G06F 21/31* (2013.01)

(52) U.S. Cl.
CPC ....................................... *G06F 21/31* (2013.01)

(58) Field of Classification Search
USPC ............................................................ 726/5
See application file for complete search history.

(56) References Cited

U.S. PATENT DOCUMENTS

| | | | |
|---|---|---|---|
| 6,161,139 A * | 12/2000 | Win et al. | 709/225 |
| 6,853,920 B2 * | 2/2005 | Hsiung et al. | 702/1 |
| 6,904,110 B2 | 6/2005 | Trans et al. | |
| 6,938,167 B2 * | 8/2005 | Roskind | 726/22 |
| 6,959,394 B1 | 10/2005 | Brickell et al. | |
| 7,167,918 B2 | 1/2007 | Byrne et al. | |
| 7,295,831 B2 * | 11/2007 | Coleman et al. | 455/410 |
| 2004/0030932 A1 | 2/2004 | Juels et al. | |
| 2005/0071645 A1 | 3/2005 | Girouard et al. | |
| 2007/0208639 A1 | 9/2007 | Lloyd et al. | |
| 2008/0155651 A1 * | 6/2008 | Wasmund | 726/2 |

OTHER PUBLICATIONS

Zhou, Q.; Lam, K; Li, J; "Lightweight Security Scheme for Mobile Online Tax Returns System"; Computer Engineering; vol. 33; No. 1; pp. 145-147; Jan. 2007.

* cited by examiner

*Primary Examiner* — Andrew Georgandellis
(74) *Attorney, Agent, or Firm* — Steven M. Greenberg, Esq.; CRGO Law

(57) ABSTRACT

Embodiments of the present invention provide a method, system and computer program product for supporting weak password authentication in a multi-user application environment. In an embodiment of the invention, a method for supporting weak password authentication in a multi-user application environment can be provided. The method can include acquiring log in data for a log in attempt by an end user amongst end users in a multi-user application. The method also can include messaging the log in data to others of the end users for subjective analysis by the others of the end users in detecting an unauthorized log in attempt.

20 Claims, 2 Drawing Sheets ized only and are not restrictive of the invention, as claimed.

WEAK PASSWORD SUPPORT IN A MULTI-USER ENVIRONMENT

BACKGROUND OF THE INVENTION

1. Field of the Invention

The present invention relates to the field of network security and more particularly to compromised password use in a network environment.

2. Description of the Related Art

Applications level security has been of paramount concern for applications administrators for decades. While access to an application, its features and data can be of no consequence for the most simple of computing tools such as a word processor or spreadsheet, for many applications, access must be restricted. For example, in multi-user computing applications such as groupware, financial applications, social networking applications and other such applications processing sensitive data, as well as in computing administration type applications, protecting both confidentiality and access to important and powerful computing functions can be so important so as to require access control.

Generally, applications level security incorporates authentication logic for retrieving or otherwise obtaining unique data such as a pass-phrase, key, PIN, code, biometric data, or other such personally identifying information (collectively referred to as a "password"). Once retrieved, the password along with a user identifier can be compared to a known password for the user. If the comparison can be performed favorably, the password can be validated and access can be granted to the user as requested. In contrast, if the comparison cannot be performed favorably, access to the user can be denied. Moreover, protective measures such as invalid attempt logging can be activated.

Password based authentication to an application inherently requires the creation of a password, oftentimes by the end user to be associated with the password. Simple passwords bear no restrictions in form and commonly result in the end user selecting an easy to remember term or series of digits, such as a birth date, the name of a child, the name of a favorite pet, and the like. Passwords of this nature are referred to as "weak" in that one seeking to guess the password need only know some basic information regarding the end user, or a simple pattern users use to generate passwords, to brute-force identify the password. Accordingly, sophisticated password authentication schemes require the creation of a "strong" password of a minimum length and minimum mix of alphabetical characters and numerical characters to provide a large enough space for guessing that a brute force attack cannot succeed before it is noticed and defensive measures are used (disabling accounts, for example). Strong password schemes also prohibit the reuse of a password once the password expires which generally is required by the strong password scheme after a short period of time.

Notwithstanding, the use of a strong password scheme is not without its limitations. First, in smaller multi-user application environments in which multiple end users interact in a common computing environment, the requirement to frequently change a password can be inconvenient to the end user requiring the end user to continuously re-memorize a new password. Further, the requirement to create a complex password according to password content rules can be frustrating to the end user. Even yet further, the multi-user application may have password rules slightly different from those of the user's business, creating more burden on the user to create even more passwords. In consequence, human factors studies have shown the reluctance of end users to adopt usage of a new application when the password authentication scheme is strong in nature. Yet, to implement only a weak password scheme for an application exposes the application to malicious intrusions and resulting breaches of security and privacy.

BRIEF SUMMARY OF THE INVENTION

Embodiments of the present invention address deficiencies of the art in respect to password authentication and provide a novel and non-obvious method, system and computer program product for supporting weak password authentication in a multi-user application environment. In an embodiment of the invention, a method for supporting weak password authentication in a multi-user application environment can be provided. The method can include acquiring log in data for a log in attempt by an end user amongst end users in a multi-user application. The method also can include messaging the log in data to others of the end users for subjective analysis by the others of the end users in detecting an unauthorized log in attempt. Optionally, the multi-user application can be a multi-tenant application. Specifically, as it is well-known in the art, a multi-tenant application refers to a single instance of an application executing in a host platform and providing access to different users in different organizations on a software-as-a-service (SaaS) model.

In another embodiment of the invention, a multi-user data processing system can be configured for supporting weak password authentication. The system can include a host computing platform and a multi-user application executing in the host computing platform and providing access to the multi-user application to an application community of end users. The system also can include a weak password support module coupled to the multi-user application. The module can include program code enabled to acquire log in data for a log in attempt by an end user amongst the end users in the application community, and to message the log in data to others of the end users for subjective analysis by the others of the end users in detecting an unauthorized log in attempt to the multi-user application. For example, the log in data can include a number of unsuccessful log in attempts for an end user, a password change event for the end user, a time of day and/or a date of year for the log in attempt, an Internet protocol (IP) address for the end user, or a time zone data associated with the log in attempt.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for supporting weak password authentication in a multi-user application environment. In accordance with an embodiment of the present invention, weak passwords can be established for corresponding different end users of a multi-user application. Thereafter, log in data for each of the different end users can be communicated with others of the different end users. The log in data can include unsuccessful log in attempts, password change events, time of day and date of year attempts to log in, IP address and time zone data associated with a log in attempt, and the like. Optionally, the log in data can include textual comment provided by an end user explaining a failed log in attempt and required in response to a failed log in attempt. Anomalous log in data recognized by the different end users can be reported to a selected one of the different end users in a role of system administrator. In this way, a breach in the weak authentication password scheme for the multi-user application can be detected through communal policing in the multi-user environment.

Figure 1:
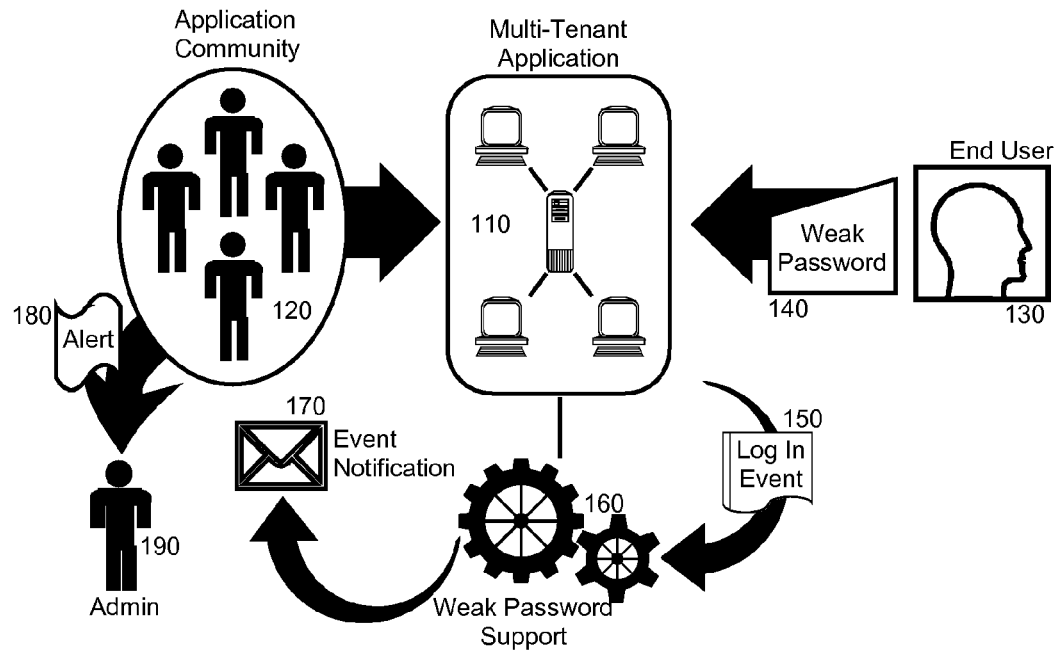
FIG. 1 is a pictorial illustration of a process for supporting weak password authentication in a multi-user application environment.

In further illustration, FIG. 1 pictorially shows a process for supporting weak password authentication in a multi-user application environment. As shown in FIG. 1, a multi-user application 110 can be provided for access and use by different users in an application community 120. In one aspect of the embodiment, the multi-user application 110 can be a multi-tenant application supporting multiple different users in multiple different organizations, each accessing the multi-tenant application in a SaaS model. The multi-user application 110 can include weak password support 160 monitoring an attempt by an end user 130 in the application community 120 attempts a log-in to the multi-user application 110 with a weak password 140. In response to a log-in attempt by the end user 130 with a weak password 140, log in event data 150 can be collected by the weak password support 160, for example a number of unsuccessful log in attempts, a password change event, a time of day and/or a date of year for the log in attempt, an IP address for the end user 130, or time zone data associated with the log in attempt, to name only a few examples.

The weak password support 160 can inspect the log in event data 150 and determine whether or not to forward a notification 170 of the log in event data 150 to the users of the application community 120. If so, a notification 170 can be messaged to selected users in the application community 120, for example users in one organization of a multi-tenant application, users meeting a specific role, users belonging to a specific group, or other such criteria. Each of the selected end users in the application community 120, in turn, can review the log in event data 150 reported by the event notification 170 to subjectively detect anomalous behavior evident from the log in attempt by the end user 130. To the extent that a user in the application community 120 receiving the event notification 170 subjectively detects anomalous behavior, the user can message an alert 180 to an administrator 190 of the multi-user application 110.

Figure 2:
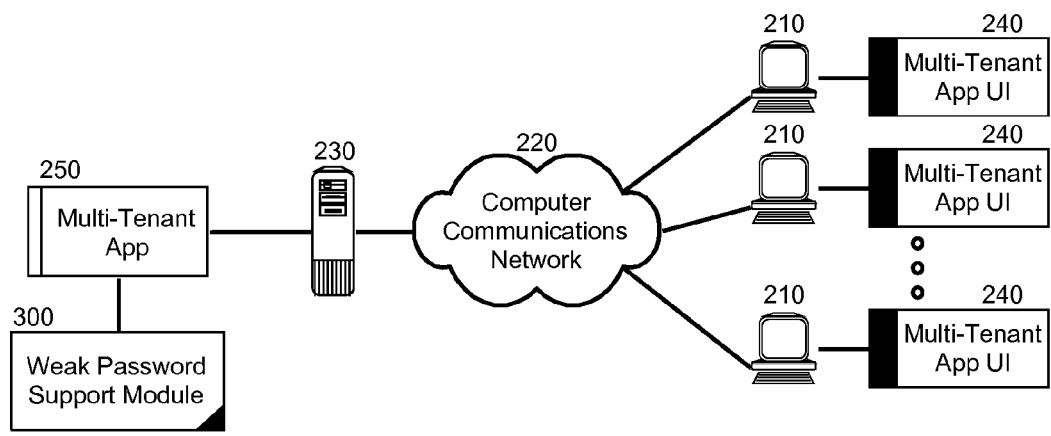
FIG. 2 is a schematic illustration of a multi-user data processing system configured for supporting weak password authentication; and, FIG. 3 is a flow chart illustrating a process for supporting weak password authentication in a multi-user application environment.

The process described in connection with FIG. 1 can be implemented within a multi-user data processing system. In further illustration, FIG. 2 schematically shows a multi-user data processing system configured for supporting weak password authentication. The system can include a host computing platform 230 configured for communicative coupling to client computing devices 210 over computer communications network 220. The host computing platform 230 can support the operation of a multi-user application 250, such as a collaborative computing environment, a groupware environment, or a multi-user financial application. The multi-user application 250, in turn, can provide access to multiple different end users over the computer communications network 220 through respective client computing devices 210 each rendering a corresponding multi-user application user interface 240.

Notably, a weak password support module 300 can be coupled to the multi-user application 250. The weak password support module 300 can include program code enabled to acquire log in data for a log in attempt by an end user to the multi-user application 250, for example a number of unsuccessful log in attempts, a password change event, a time of day and/or a date of year for the log in attempt, an IP address for the end user, or time zone data associated with the log in attempt, to name only a few examples. The program code further can be enabled to selectively message other users of the multi-user application 250 with the log in data for subjective analysis by the other end users. In this way, the other end users in analyzing the log in data, can subjectively detect an unauthorized log in attempt and can notify an administrator accordingly.

Figure 3:
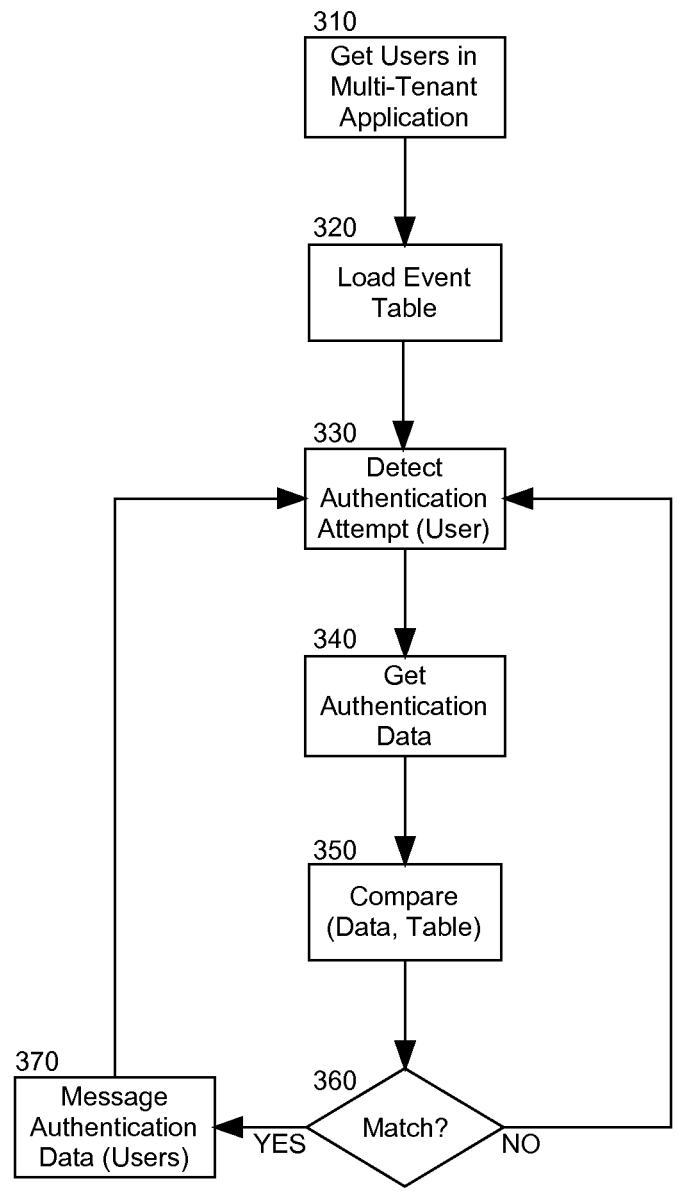

In yet further illustration of the operation of the weak password support module 300, FIG. 3 is a flow chart illustrating a process for supporting weak password authentication in a multi-user application environment. Beginning in block 310, different users in a multi-user application can be selected for weak password support. Also, in block 320 an event table can be loaded of log in events to be messaged to the different users in the multi-user application. In block 330, a log in attempt can be detected for an end user for the multi-user application and in block 340, log in data can be acquired for the log in attempt. In block 350, the log in data can be compared to the table and in decision block 360, if the log in data matches an entry in the table, in block 370 the log in data can be messaged to the different end users for subjective analysis.

Optionally, end users receiving the log in data can report detected anomalies. For instance, the end users can report detected anomalies through a pre-defined user interface. When a threshold number of end users report detected anomalies, a system administrator can be alerted. Alternatively, when an individual or threshold number of end users of a particular role (such as a manager) reports a detected anomaly, the system administrator can be alerted.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for supporting weak password authentication in a multi-user application environment, the method comprising:
   registering a different weak password without minimum length or minimum mix of alphabetical and numerical characters for each of a multiplicity of different end users in the multi-user application environment;
   detecting an event in the multi-user application environment indicating a failed log in attempt by an end user amongst the different end users in the multi-user application environment; and,
   responsive to the detected event, acquiring log in data for the end user, comparing the acquired log in data to log in events in a table of log in events and if the acquired log in data matches an entry in the table, messaging the acquired log in data to others of the different end users for subjective analysis by the others of the different end users in detecting an unauthorized log in attempt, and transmitting a message indicating the unauthorized log in attempt by at least one of the different end users to an administrator of the multi-user application environment so as to implement communal policing of the multi-user application environment.

2. The method of claim 1, wherein acquiring log in data for a log in attempt by an end user amongst end users in a multi-user application, comprises acquiring a number of unsuccessful log in attempts for a log in attempt by an end user amongst end users in a multi-user application.

3. The method of claim 1, wherein acquiring log in data for a log in attempt by an end user amongst end users in a multi-user application, comprises acquiring a password change event for an end user amongst end users in a multi-user application.

4. The method of claim 1, wherein acquiring log in data for a log in attempt by an end user amongst end users in a multi-user application, comprises acquiring a time of day and/or a date of year for the log in attempt.

5. The method of claim 1, wherein acquiring log in data for a log in attempt by an end user amongst end users in a multi-user application, comprises acquiring an Internet protocol (IP) address for the log in attempt.

6. The method of claim 1, wherein acquiring log in data for a log in attempt by an end user amongst end users in a multi-user application, comprises acquiring time zone data associated with the log in attempt.

7. A multi-user data processing system configured for supporting weak password authentication, the system comprising:
   a host computing platform;
   a multi-user application executing in the host computing platform and providing access to the multi-user application to an application community of end users; and,
   a weak password support module coupled to the multi-user application, the module comprising program code enabled to register a different weak password without minimum length or minimum mix of alphabetical and numerical characters for each of a multiplicity of different end users in the multi-user application environment, detect an event in the multi-user application environment indicating a failed log in attempt by an end user amongst the different end users in the multi-user application environment, and respond to the detected event by acquiring log in data for the end user, comparing the acquired log in data to log in events in a table of log in events and if the acquired log in data matches an entry in the table, messaging the acquired log in data to others of the different end users for subjective analysis by the others of the different end users in detecting an unauthorized log in attempt, and transmitting a message indicating the unauthorized log in attempt by at least one of the different end users to an administrator of the multi-user application environment so as to implement communal policing of the multi-user application environment.

8. The system of claim 7, wherein the multi-user application is a multi-tenant application and the end users in the application community are users from different organizations subscribing to the multi-tenant application in a software-as-a-service (SaaS) model.

9. The system of claim 7, wherein the end users in the application community are a subset of all end users in the application community selected according to role.

10. The system of claim 7, wherein the log in data is a number of unsuccessful log in attempts for an end user.

11. The system of claim 7, wherein the log in data is a password change event for the end user.

12. The system of claim 7, wherein the log in data is a time of day and/or a date of year for the log in attempt.

13. The system of claim 7, wherein the log in data is an Internet protocol (IP) address for the end user.

14. The system of claim 7, wherein the log in data is a time zone data associated with the log in attempt.

15. A computer program product comprising a non-transitory computer usable storage medium storing computer usable program code for supporting weak password authentication in a multi-user application environment, the computer program product comprising:
   computer usable program code for registering a different weak password without minimum length or minimum mix of alphabetical and numerical characters for each of a multiplicity of different end users in the multi-user application environment;
   computer usable program code for detecting an event in the multi-user application environment indicating a failed log in attempt by an end user amongst the different end users in the multi-user application environment; and, computer usable program code for responding to the detected event by acquiring log in data for the end user, comparing the acquired log in data to log in events in a table of log in events and if the acquired log in data matches an entry in the table, messaging the acquired log in data to others of the different end users for subjective analysis by the others of the different end users in detecting an unauthorized log in attempt, and transmitting a message indicating the unauthorized log in attempt by at least one of the different end users to an administrator of the multi-user application environment so as to implement communal policing of the multi-user application environment.

16. The computer program product of claim 15, wherein the computer usable program code for acquiring log in data for a log in attempt by an end user amongst end users in a multi-user application, comprises computer usable program code for acquiring a number of unsuccessful log in attempts for a log in attempt by an end user amongst end users in a multi-user application.

17. The computer program product of claim 15, wherein the computer usable program code for acquiring log in data for a log in attempt by an end user amongst end users in a multi-user application, comprises computer usable program code for acquiring a password change event for an end user amongst end users in a multi-user application.

18. The computer program product of claim 15, wherein the computer usable program code for acquiring log in data for a log in attempt by an end user amongst end users in a multi-user application, comprises computer usable program code for acquiring a time of day and/or a date of year for the log in attempt.

19. The computer program product of claim 15, wherein the computer usable program code for acquiring log in data for a log in attempt by an end user amongst end users in a multi-user application, comprises computer usable program code for acquiring an Internet protocol (IP) address for the log in attempt.

20. The computer program product of claim 15, wherein the computer usable program code for acquiring log in data for a log in attempt by an end user amongst end users in a multi-user application, comprises computer usable program code for acquiring time zone data associated with the log in attempt.

* * * * *